United States Patent
da CUNHA (10) Patent No.: US 11,958,587 B2
(45) Date of Patent: Apr. 16, 2024

(54) MOLDED AIRCRAFT WIRING AND/OR TUBING SUPPORT BRACKETS

(71) Applicant: EMBRAER S.A., São José dos Campos-SP (BR)

(72) Inventor: Denizete Borges da CUNHA, São José dos Campos-SP (BR)

(73) Assignee: EMBRAER S.A., São José dos Campos-SP (BR)

( * ) Notice: Subject to any disclaimer, the term of this patent is extended or adjusted under 35 U.S.C. 154(b) by 0 days.

(21) Appl. No.: 17/824,593

(22) Filed: May 25, 2022

(65) Prior Publication Data

US 2022/0281584 A1 Sep. 8, 2022

Related U.S. Application Data

(63) Continuation-in-part of application No. 17/214,535, filed on Mar. 26, 2021, now abandoned.

(60) Provisional application No. 63/001,789, filed on Mar. 30, 2020.

(51) Int. Cl.
*B64C 1/40* (2006.01)
*F16L 3/12* (2006.01)
*H02G 3/04* (2006.01)

(52) U.S. Cl.
CPC ........... *B64C 1/406* (2013.01); *H02G 3/0456* (2013.01); *F16L 3/12* (2013.01)

(58) Field of Classification Search
CPC ........ B64C 1/406; H02G 3/0456; H02G 3/32; F16L 3/12
See application file for complete search history.

(56) References Cited

U.S. PATENT DOCUMENTS

| | | | | |
|---|---|---|---|---|
| 8,647,035 | B2* | 2/2014 | Bakken | F16B 17/006 |
| | | | | 411/108 |
| 9,435,369 | B2* | 9/2016 | Deck | F16B 39/24 |
| 9,528,542 | B2* | 12/2016 | Fortunato | F16B 37/048 |

(Continued)

FOREIGN PATENT DOCUMENTS

CN 204041711 U * 12/2014

OTHER PUBLICATIONS

Click bond online article "building a better nut plate" by Paul Dye, dated Oct. 19, 2018, https://www.kitplanes.com/bondclick-bond/ ( Year: 2018).*

(Continued)

*Primary Examiner* — Terrell L McKinnon
*Assistant Examiner* — Ding Y Tan
(74) *Attorney, Agent, or Firm* — NIXON & VANDERHYE P.C.

(57) ABSTRACT

One-piece molded thermoplastic L-shaped and Z-shaped support brackets are described for supporting wiring and/or tubing. The support brackets will include a lower support flange, a backing flange, and a junction region having a concave inner surface and a convex outer surface which integrally joins the lower support flange and the backing flange to one another at a substantially right angle. The support brackets may be provided with a unitarily molded nut plate boss and a metal threaded nut cylinder which is embedded within and overmolded with the nut plate boss. Alternatively, a wire, cable or tubing mount unitarily formed as a one-piece molded unit with one of the support flanges so as to dependently extend therefrom.

19 Claims, 12 Drawing Sheets

(56) References Cited

U.S. PATENT DOCUMENTS

| | | | | |
|---|---|---|---|---|
| 2008/0101887 | A1* | 5/2008 | Toosky | F16B 17/006 411/181 |
| 2012/0317787 | A1* | 12/2012 | Ross | B21D 39/04 411/174 |
| 2013/0187014 | A1* | 7/2013 | James | F16B 39/28 248/222.14 |
| 2014/0075957 | A1* | 3/2014 | Boehne | F02C 7/00 60/797 |
| 2015/0316091 | A1* | 11/2015 | James | H02G 3/32 411/166 |
| 2021/0179251 | A1* | 6/2021 | Funke | B64C 1/066 |
| 2021/0301947 | A1 | 9/2021 | da Cunha | |

OTHER PUBLICATIONS

Uxcell plastic corner braces/ angle brackets, sold on amazon.com, (first available date: Oct. 18, 2019) https://www.amazon.com/uxcell-Cabinet-Plastic-39×39×16mm-Brackets/dp/B07Y489LBK (Year: 2019).*

MroMax plastic corner brace/ angle brackets sold on amazon.com, (first available date: Dec. 8, 2019) https://www.amazon.com/MroMax-Plastic-Furniture-Support-Bracket/dp/B082GQV9HB?th=1 (Year: 2019).*

Compositesworld article by Ginger Gardiner titled "Recycled thermoplastic composites for production" dated Mar. 7, 2019, https://www.compositesworld.com/articles/recycled-thermoplastic-composites-for-production (Year: 2019).*

Netcomposite news release: "Bucher and Ensinger Develop Thermoplastic Connector Mountings for Aircraft Interiors" dated Nov. 13, 2018 (Year: 2018).*

Materials Today article "Dutch Thermoplastic Components exhibits at The Composites Engineering Show 2011" dated Oct. 25, 2011 (Year: 2011).*

Australian government civil aviation safety authority advisory circular AC21-99 dated Nov. 2005, https://www.steinair.com/wp-content/uploads/2016/03/Advisory-Circular-AC-021c99-AIRCRAFT-WIRING-BONDING-.pdf (Year: 2005).*

TxV Aero composite online news article titled "Re-engineering aircraft bracket using high-performance thermoplastic components" dated Mar. 8, 2019 (Year: 2019).*

Uxcell Plastic Corner Braces/Angle Brackets, sold on amazon.com, (first available date: Oct. 18, 2019); weblink https://www.amazon.com/uxcell-Cabinet-Plastic-39×39×16mm-Brackets/dp/B07Y489LBK (Year: 2019).

MroMax plastic corner brace/angle brackets sold on amazon.com, (first available date: Dec. 8, 2019) (Year 2019).

Compositesworld article by Ginger Gardiner titled "Recycled thermoplastic composites for production" dated Mar. 7, 2019 (Year: 2019).

Plastic Today article "PEEK aerospace brackets for Bombardier aircraft drive down manufacturing costs" dated Jun. 10, 2015 (Year: 2015).

Greene, Tweed paper authors: Tim Greene et al., "Complex-Shape Metallic Aircraft Engine Bracket Replacement Using Compression Molded Discontinuous Long Fiber Thermoplastic Composites" 2015, 17 pages. (Year: 2015).

* cited by examiner

MOLDED AIRCRAFT WIRING AND/OR TUBING SUPPORT BRACKETS

CROSS-REFERENCE TO RELATED APPLICATION

This application is a continuation-in-part (CIP) of copending U.S. application Ser. No. 17/214,535 filed on Mar. 26, 2021, which in turn is based on and claims domestic priority benefits of U.S. Provisional Application Ser. No. 63/001,789 filed on Mar. 30, 2020, the entire contents of which are expressly incorporated herein by reference.

FIELD

The embodiments disclosed herein relate generally to wiring and/or tubing support brackets that may be employed usefully to route wiring and/or tubing within an aircraft. In preferred forms, the support brackets are embodied in one-piece molded thermoplastic bracket structures to which a wiring mount and/or tubing clamp may be operatively connected.

BACKGROUND

L-shaped and Z-shaped metal brackets are conventionally employed in the aviation industry to support and route electrical wiring, cable harnesses and tubing (e.g., pneumatic, hydraulic and fuel lines) within aircraft components such as the aircraft's fuselage and aerodynamic structures. The principal difference between the metallic supports is typically embodied in the surface finishing and/or the specific hardware installation (e.g., a backing nut plate or a wire/cable support) that is attached to the bracket.

Conventional metal brackets may be coated with primer and/or polyurethane finishes which promote corrosion protection. However, there is the possibility that a bracket that is not coated or incorrectly coated may be installed onto the aircraft's structure which in turn affects the maintenance cycle time for such components. Conventional metal support brackets therefore typically require special surface treatment and/or coating in controlled paint booths which in turn increases part costs due to the involved manpower as well as environmental licensing requirements. Due to such surface treatments and/or paint coatings, it is also typically more difficult to recycle conventional metal support brackets.

It would therefore be highly desirable if non-metal aircraft wiring and/or tubing support brackets could be provided which minimize if not eliminate the problems noted above which are attendant to conventional metal support brackets. It is towards fulfilling such needs that the embodiments disclosed herein are directed.

BRIEF DESCRIPTION

Broadly, the embodiments disclosed herein are directed toward one-piece molded thermoplastic L-shaped support bracket for supporting wiring and/or tubing, the support bracket comprising a lower support flange, a backing flange; and a junction region having a concave inner surface and a convex outer surface which integrally joins the lower support flange and the backing flange to one another at a substantially right angle. The support bracket may further comprises right and left generally triangularly-shaped side walls integrally joining the lower support flange and the backing flange.

Each of the right and left side walls may a perimeter flange having a generally triangularly-shaped lateral edge, and a side wall plate joined to the lateral edge of the perimeter flange. The side walls will generally define a right triangle with respective adjoining right angle legs being integral with the lower support flange and the backing flange and a planar or concavely curved hypotenuse leg extending downwardly from the backing flange to a terminal end of the lower support flange.

According to some embodiments, a Z-shaped support bracket is provided which is structurally similar to the L-shaped support bracket but includes an upper support bracket integrally joined to an upper end of the backing flange and extending rearwardly therefrom substantially parallel to the lower support bracket. A second junction region having a concave inner surface and a convex outer surface may therefore be provided so as to integrally join the upper support flange and backing flange to one another at a substantially right angle.

The backing flange of the L-shaped support bracket or the upper support flange of the Z-shaped support bracket may be provided with a pair of lateral convex lobes and a central concave recess between the convex lobes. The lower support flange may define a bolt-receiving aperture for allowing a nut back plate or a wiring mount to be operatively associated therewith. The backing support flange of the L-shaped support bracket or the upper support flange of the Z-shaped support bracket may also be provided with a pair of apertures to facilitate connection of the bracket to adjacent structural components of the aircraft.

Other embodiments will be provided as a one-piece molded thermoplastic L-shaped support bracket for supporting wiring and/or tubing, the support bracket comprising a first support flange, a second flange and a nut plate formed with the first support flange. The nut plate will comprise a nut plate boss which is formed as a one-piece molded unit with the first support flange, and a metal threaded nut cylinder which is embedded within and overmolded with the nut plate boss. A third support flange unitarily molded with the second support flange and extends in an opposite direction of the first support flange (i.e., so as to form a Z-shaped support bracket).

Still further embodiments will be in the form of a one-piece molded thermoplastic support bracket for supporting wiring and/or tubing, the support bracket comprising first and second oppositely extending support flanges, a third support flange having opposite ends which are respectively unitarily joined to the first and second support flanges and a wire, cable or tubing mount unitarily formed as a one-piece molded unit with the first support flange so as to dependently extend therefrom. The wire, cable or tubing mount may include a pair of laterally spaced apart apertured mounting fibers which define a space therebetween.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 2 and 3 are top front perspective views of an L-shaped molded support bracket in accordance with one embodiment of the invention, wherein FIG. 2 depicts a backing nut plate attached to the top surface of the support flange thereof while FIG. 3 depicts the backing nut plate separated from such support flange;

FIGS. 4 and 5 are bottom rear perspective views of the L-shaped molded support bracket shown in FIGS. 2 and 3 but provided with a wiring mount attached to the bottom surface of the support flange, wherein FIG. 4 depicts the wiring mount attached to the bottom surface of the support flange while FIG. 5 depicts the wiring mount separated from such support flange;

FIGS. 13 and 14 are rear and front perspective views, respectively, of a Z-shaped molded support bracket in accordance with one embodiment of the invention, wherein FIG. 13 depicts a wiring mount attached to the bottom surface of the support flange thereof while FIG. 13 depicts the wiring mount separated from such support flange;

FIGS. 15 and 16 are each front perspective views of the Z-shaped molded support bracket shown in FIGS. 13 and 14 but provided with a backing nut plate attached to the top surface of the support flange, wherein FIG. 15 depicts the backing nut plate attached to the top surface of the support flange while FIG. 16 depicts the backing nut plate separated from such support flange;

DETAILED DESCRIPTION OF EMBODIMENTS

Figure 1:
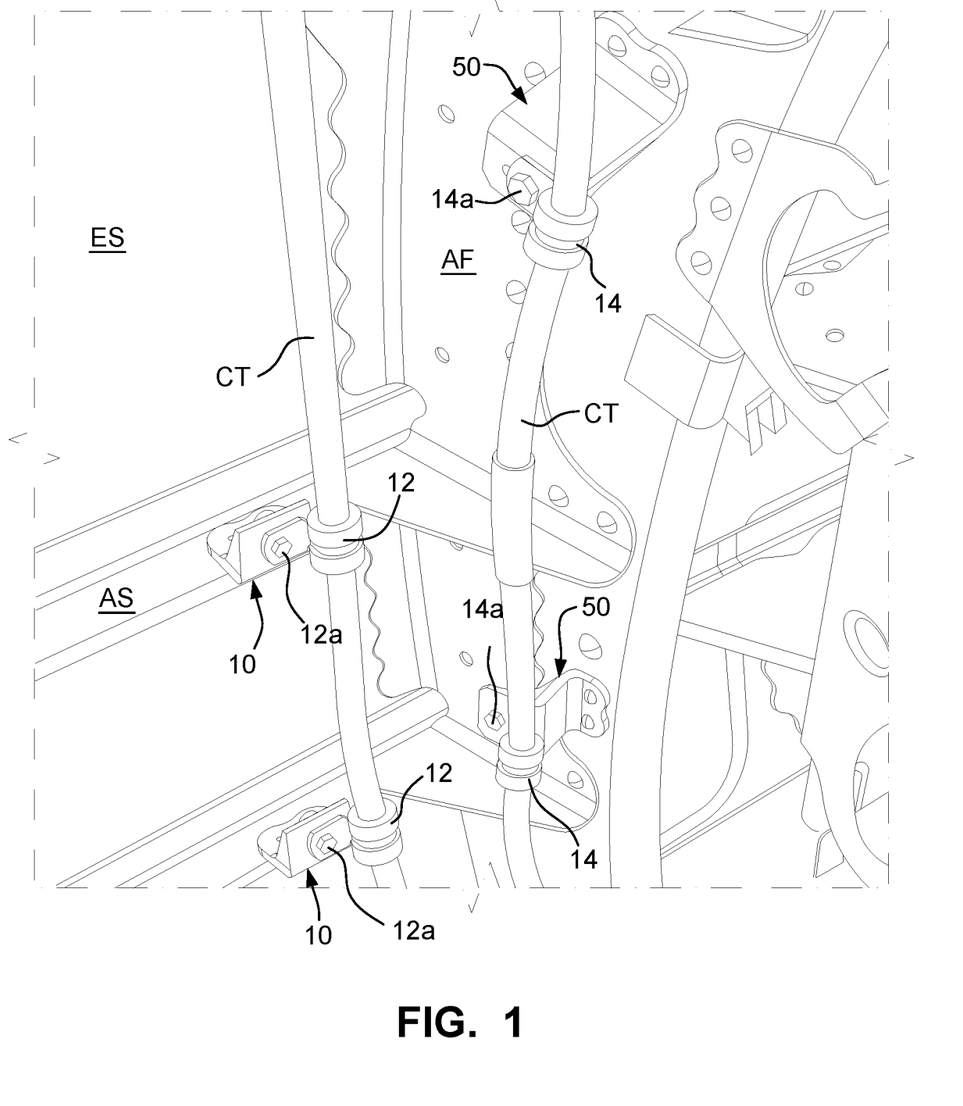
FIG. 1 is an enlarged perspective view of a portion of an aircraft interior showing representative L-shaped and Z-shaped molded support brackets in accordance with embodiments of the invention.
Figure 2:
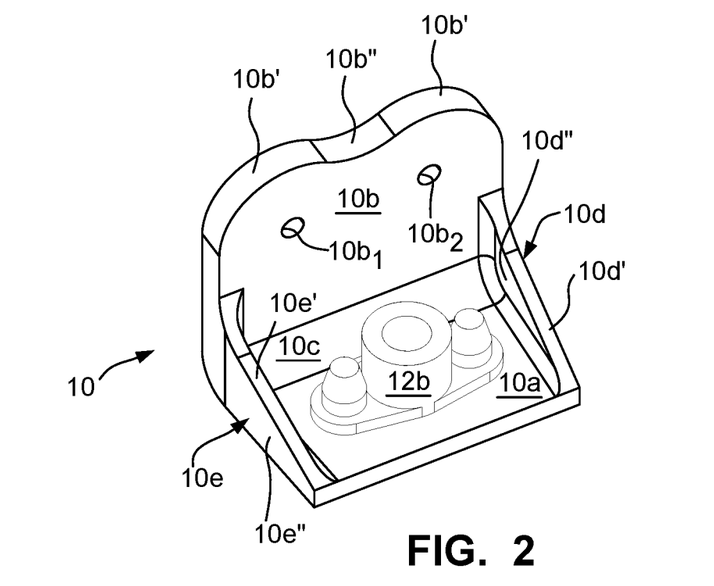
Figure 3:
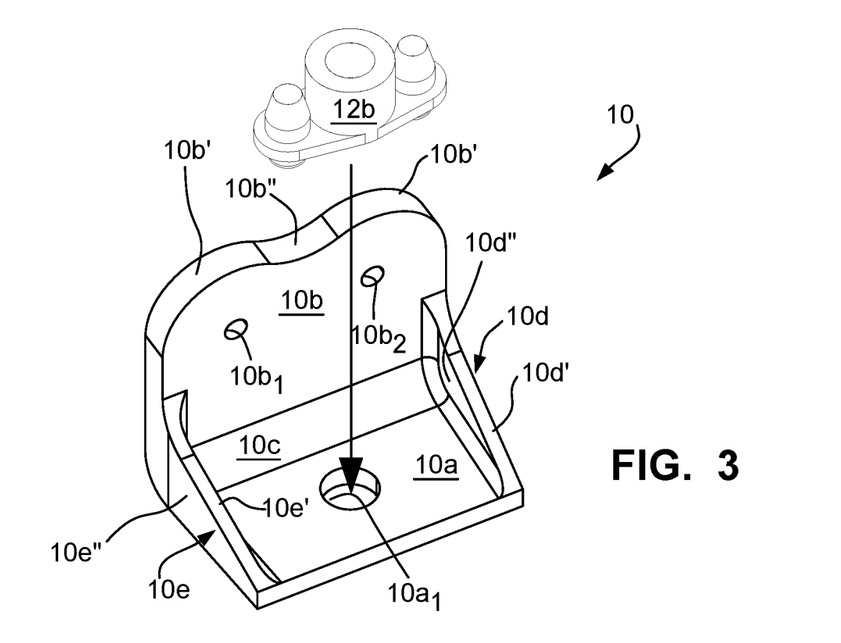
Figure 4:
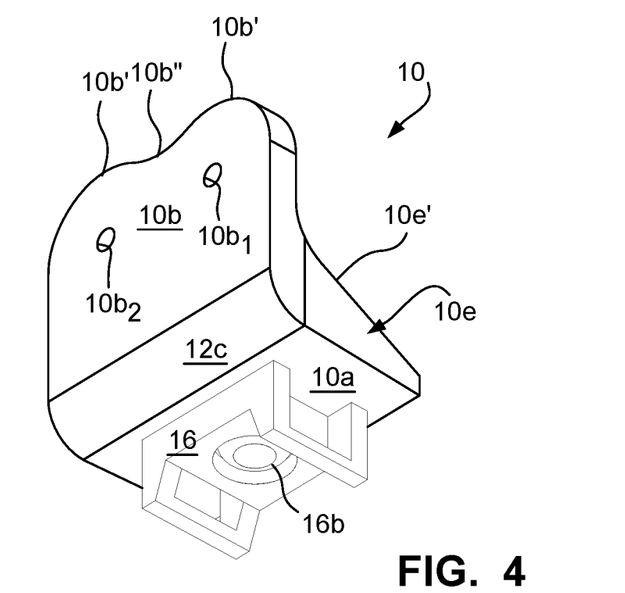
Figure 5:
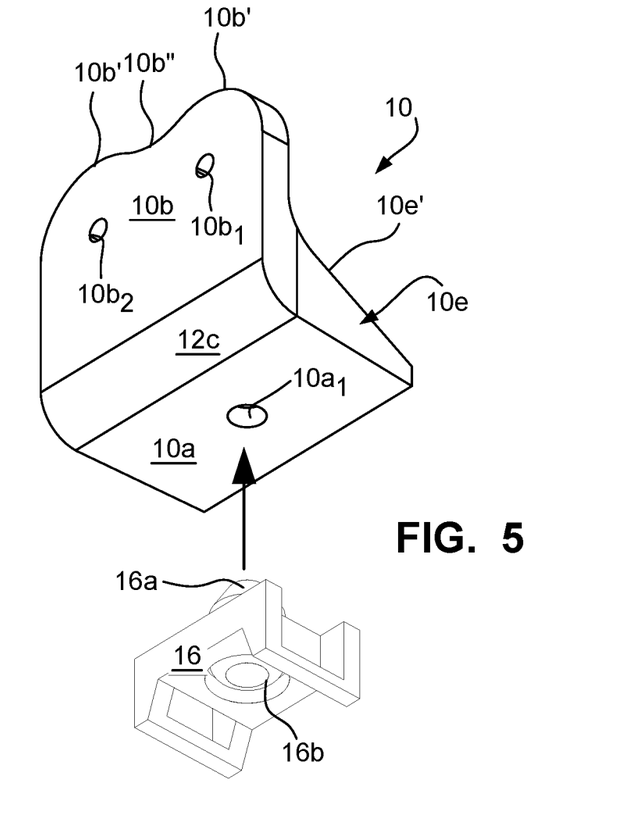
Figure 6:
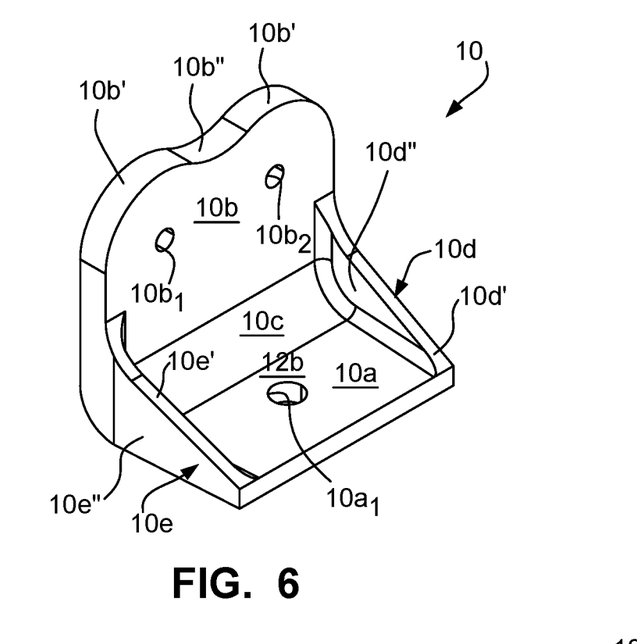
FIG. 6 is a right front perspective view of the L-shaped molded support bracket in accordance with an embodiment of the invention.
Figure 7:
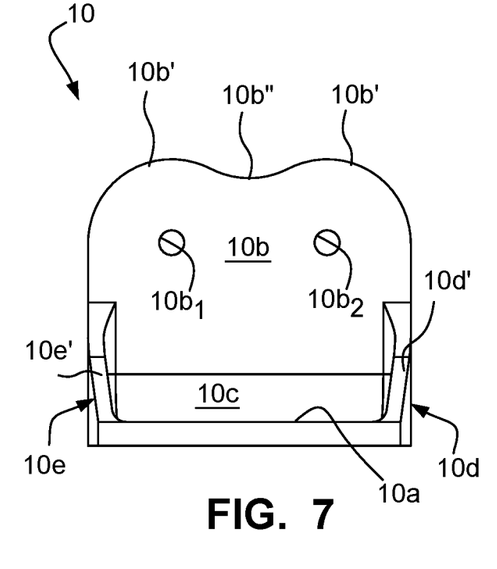
FIGS. 7 and 8 are front and rear elevational views, respectively, of the L-shaped molded support bracket shown in FIG. 6.
Figure 8:
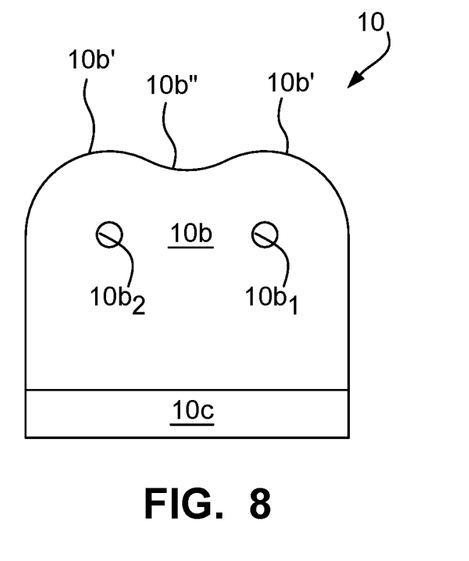
Figure 9:
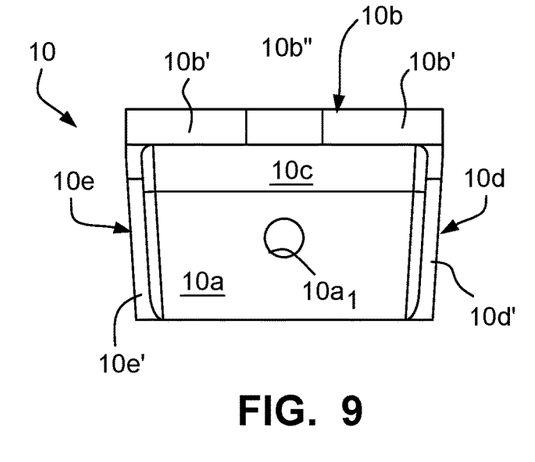
FIGS. 9 and 10 are top and bottom plan views, respectively, of the L-shaped molded support bracket shown in FIG. 6.
Figure 10:
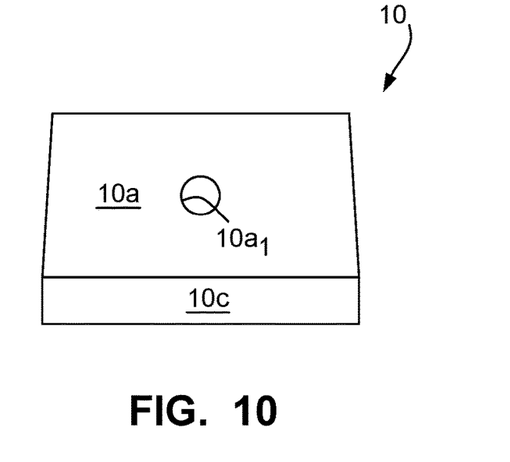
Figure 11:
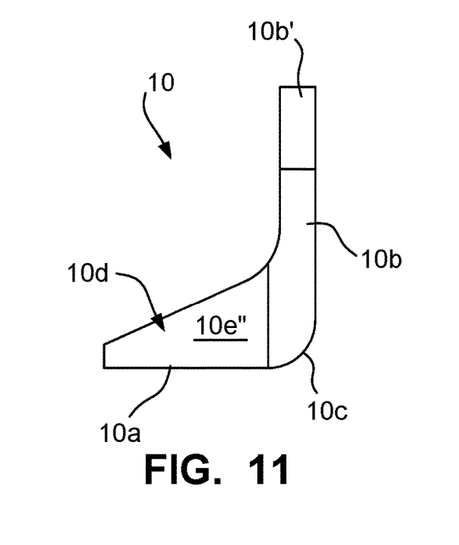
FIGS. 11 and 12 are left and right elevational views, respectively, of the L-shaped molded support bracket shown in FIG. 6.
Figure 12:
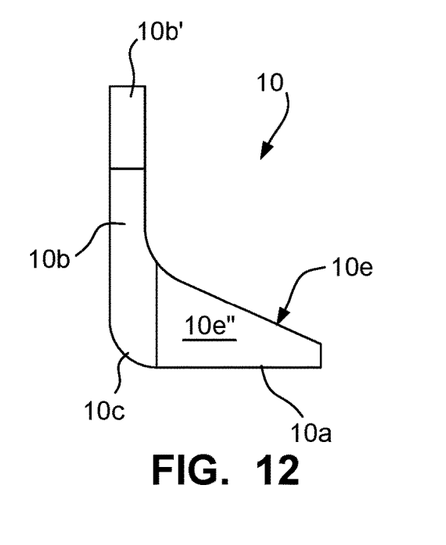
Figure 13:
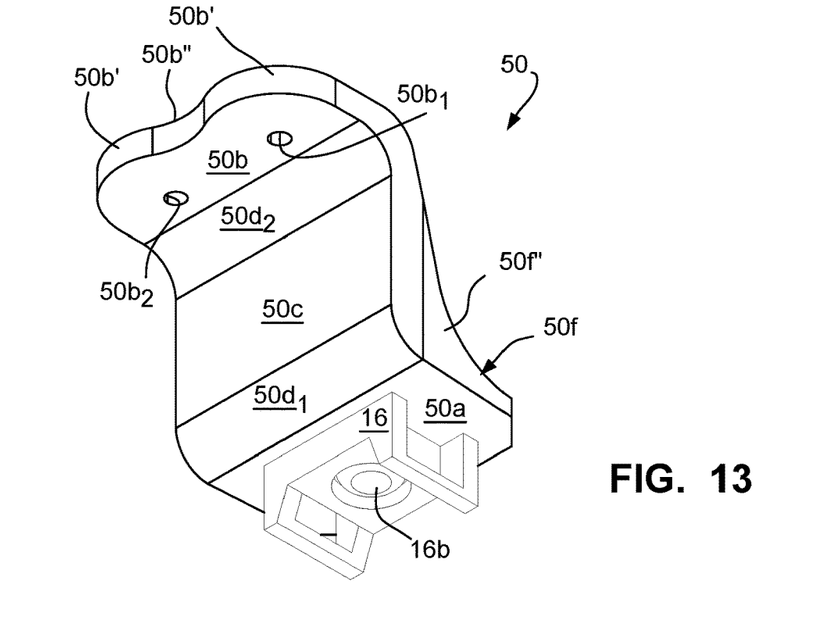
Figure 14:
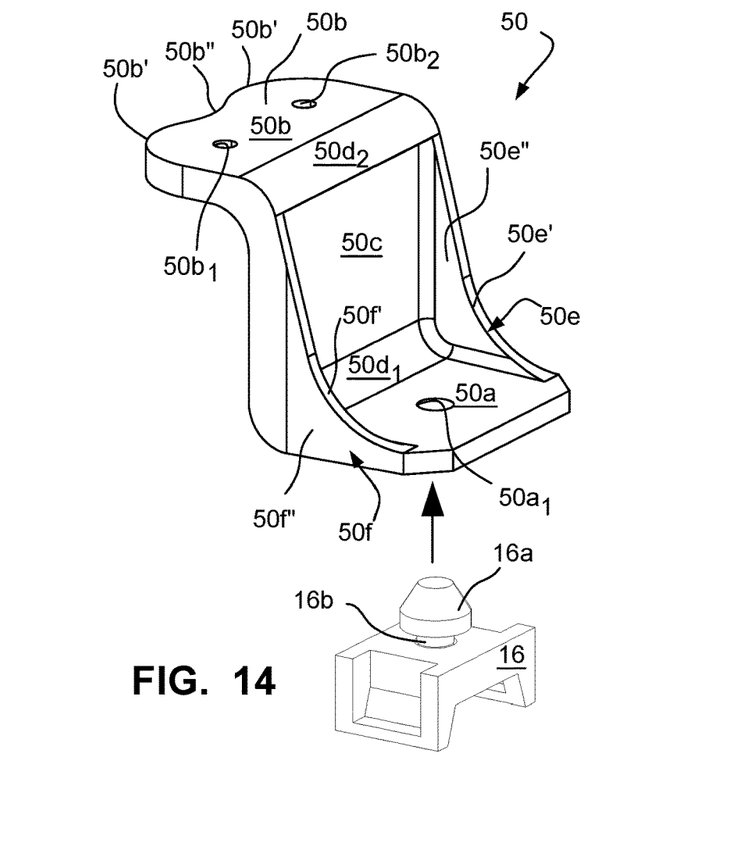

An exemplary interior portion of an aircraft structure (e.g., the aircraft's fuselage, wing or other interior structural component) is depicted in FIG. 1. More specifically, accompanying FIG. 1 depicts an interior of an aircraft comprised of conventional aircraft structural components such as an airframe component AF, an aircraft stringer component AS and external skin component ES which are connected together so as to collectively form a portion of the aircraft structure. As shown, several of the L-shaped molded support brackets 10 and Z-shaped molded support brackets 50 in accordance with the embodiments disclosed herein are connected to the aircraft stringer component AS and airframe component AF, respectively, so as to support cable and/or tubing CT being routed from between locations of the aircraft. The cable and/or tubing CT is physically attached to and thereby supported by the brackets 10 and 50 via conventional clamps 12 and 14, respectively (e.g., by means of bolts 12a, 14a being threadably connected to a nut back plate 12b, 14b, respectively, which are not shown in FIG. 1, but depicted in FIGS. 2-3 and 15-16). It will be understood in this regard that the brackets 10, 50 could alternatively be provided with wiring mounts 16 (see FIGS. 4-5 and 13-14) so as to allow wiring harnesses, electrical and/or electronic cables to be physically tied to and thus supported by the brackets 10, 50.

The L-shaped molded support bracket 10 in accordance with an embodiment of this invention is shown in greater detail in accompanying FIGS. 2-12. As shown therein, the bracket 10 is essentially a one-piece component structure molded from a suitable thermoplastics material (e.g., nylon, polyolefin or the like). Most preferably the bracket 10 is an injection-molded one-piece component formed of a suitable injection moldable thermoplastic material. The embodiment of the support bracket 10 depicted in the accompanying FIGS. 2-12 includes a lower support flange 10a and a backing flange 10b at substantially a right angle (90°) relative to one another. The junction region 10c integrally joining the lower and backing flanges 10a, 10b, respectively, is most preferably a curved transition having a concave inner surface and a convex outer surface. As is perhaps shown more clearly by FIG. 7, the lower support flange 10a is outwardly convergingly tapered such that the distalmost free end has a lesser dimension as compared to the dimension of the proximal end joined to the junction region 10c.

The lower and backing flanges 10a, 10b are integrally joined to one another by opposed generally triangularly-shaped right and left side walls 10d, 10e, respectively. Each of the side walls 10d, 10e includes a generally triangular perimeter flange 10d', 10e' and a side wall plate 10d", 10e" joined to the lateral edges thereof, respectively. The side walls 10d, 10e thereby generally define a right triangle with respective adjoining right angle legs being integral with the lower and backing support flanges 10a, 10b and a substantially planar hypotenuse leg extending downwardly from the backing support flange 10b to the terminal end of the lower support flange 10a.

The backing flange 10b includes a pair of lateral convex lobes 10b' and a central concave recess 10b". An aperture 10a-1 may be formed in the lower support flange 10a so as to accommodate the bolt 12a when using the nut back plate 12b or to allow a bolt 16b to be threadable engaged with a backing nut 16a (see FIGS. 4 and 5) and thereby attach the wiring mount 16 to the lower support flange 10a.

Apertures $10b_1$ and $10b_2$ may also be formed in the backing flange 10b so as to allow the bracket 10 to be attached physically to aircraft structures (e.g., via rivets, screws, bolts and the like).

The Z-shaped molded support bracket 50 in accordance with an embodiment of this invention is shown in greater detail in accompanying FIGS. 13-23. As shown therein, the bracket 50 is essentially a one-piece component structure molded from a suitable thermoplastics material (e.g., nylon, polyolefin or the like). Most preferably the bracket 50 is an injection-molded one-piece component formed of a suitable injection moldable thermoplastic material. The embodiment of the support bracket 50 depicted in the accompanying FIGS. 13-23 includes a lower forwardly extending support flange 50a, an upper rearwardly extending support flange 50b and a central backing flange 50c having lower and upper ends respectively joined to the lower and upper support flanges 50a, 50b. As shown, the lower and upper support flanges 50a, 50b, respectively, are essentially parallel to one another with the central backing flange 50c being joined to the lower and upper support flanges 50a, 50b at substantially right angles (90°) relative thereto. The forward edge of the lower backing flange 50a may have beveled corners.

Junction regions $50d_1$, $50d_2$ respectively integrally join the lower and upper support flanges 50a, 50b to the central support flange 50c. Each of the junction regions $50d1$, $50d_2$ is most preferably a curved transition having a concave inner surface and a convex outer surface.

The lower and backing flanges 50a, 50c, respectively, are integrally joined to one another by opposed generally triangularly-shaped right and left side walls 50e, 50f, respectively. Each of the side walls 50e, 50f includes a generally triangular perimeter flange 50e', 50f' and a side wall plate 50e", 50f" joined to the lateral edges thereof, respectively. The side walls 50e, 50f thereby generally define a right triangle with respective adjoining right angle legs being integral with the lower and backing support flanges 50a, 50c and a concavely curved hypotenuse leg extending downwardly from the backing support flange 50c to the terminal end of the lower support flange 50a.

The upper support flange 50b includes a pair of lateral convex lobes 50b' and a central concave recess 50b". An aperture 50a-1 may be formed in the lower support flange 50a so as to accommodate the bolt 12a when using the nut back plate 12b or to allow a bolt 16b to be threadable engaged with a backing nut 16a (see FIGS. 13 and 14) and thereby attach the wiring mount 16 to the lower support flange 50a. Apertures $50b_1$ and $50b_2$ may also be formed in the backing flange 50b so as to allow the bracket 50 to be attached physically to aircraft structures (e.g., via rivets, screws, bolts and the like).

A further embodiment of an L-shaped molded support bracket 60 is shown in accompanying FIGS. 24-27. As shown therein, the bracket 60 is essentially a one-piece (unitary) component structure molded from a suitable thermoplastics material (e.g., nylon, polyolefin or the like). Most preferably the bracket 60 is an injection-molded one-piece component formed of a suitable injection moldable thermoplastic material. The embodiment of the support bracket 60 depicted in the accompanying FIGS. 24-27 is similar to the bracket 10 shown in FIGS. 2 and 3 as it includes a first (lower) support flange 60a and a second (backing) flange 60b at substantially a right angle (90°) relative to one another. The junction region 60c integrally joining the lower and backing flanges 60a, 60b, respectively, is most preferably a curved transition having a concave inner surface and a convex outer surface. As is perhaps shown more clearly by FIG. 26, the first support flange 60a is outwardly convergingly tapered such that the distalmost free end has a lesser dimension as compared to the dimension of the proximal end joined to the junction region 60c.

Figure 27:
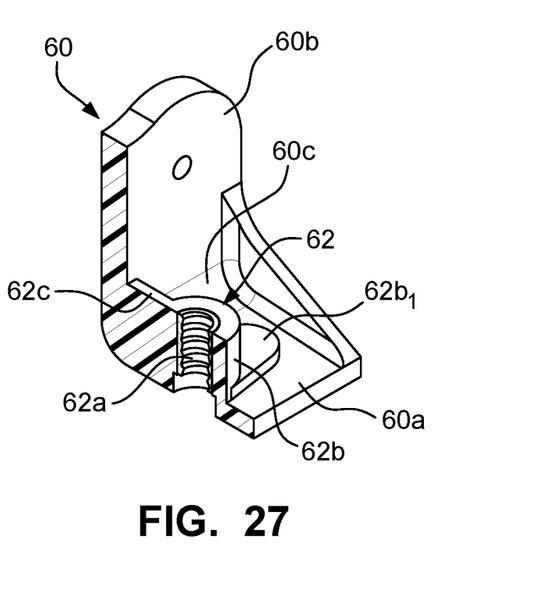
FIG. 27 is a cross-sectional perspective view of the L-shaped molded support bracket taken along line 27-27 in FIG. 26.

Important to the embodiment of the bracket 60, the nut plate 62 is provided as a one-piece molded unit with the first and second flanges 60a, 60b as shown in FIG. 27. In this regard, the nut plate 62 includes a metal threaded nut cylinder 62a which is embedded within and overmolded with the moldable thermoplastic material forming the cylindrical nut plate boss 62b (as well as the remainder of the molded bracket 60) extending from a generally elliptical planar nut plate base $62b1$ unitarily molded on the first flange 60a. A planar supporting web 62c is also unitarily molded with the nut plate boss 62b and extends radially from the nut plate boss 62b toward the second flange 60b. The supporting web 62c is thus unitarily joined to both the first and second flanges 60a, 60b as well as being unitarily joined to the cylindrical nut plate boss 62b.

Figure 15:
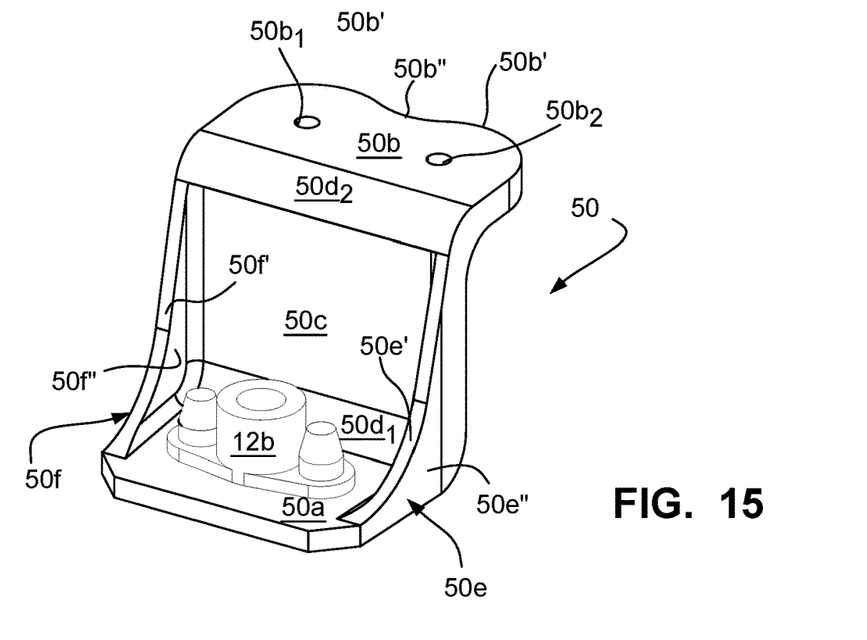
Figure 16:
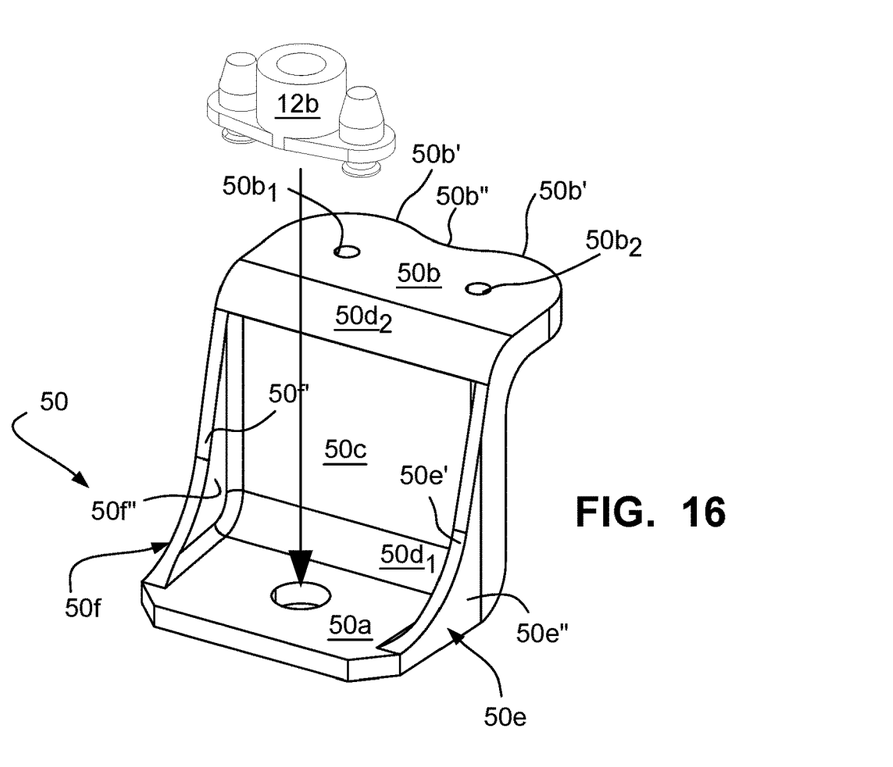
Figure 17:
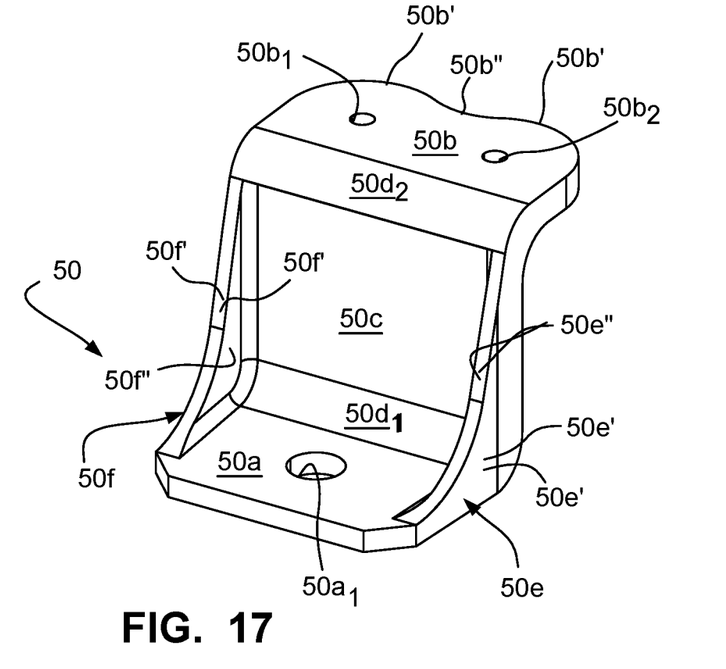
FIG. 17 is a left front perspective view of the Z-shaped molded support bracket in accordance with an embodiment of the invention.
Figure 18:
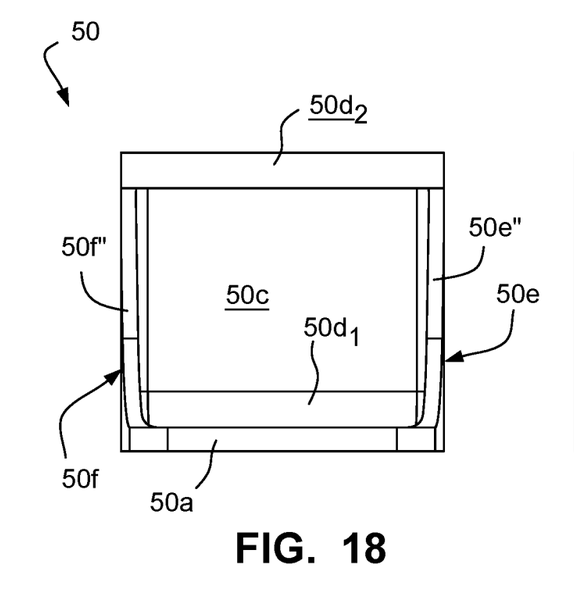
FIGS. 18 and 19 are front and rear elevational views, respectively, of the Z-shaped molded support bracket shown in FIG. 17.
Figure 19:
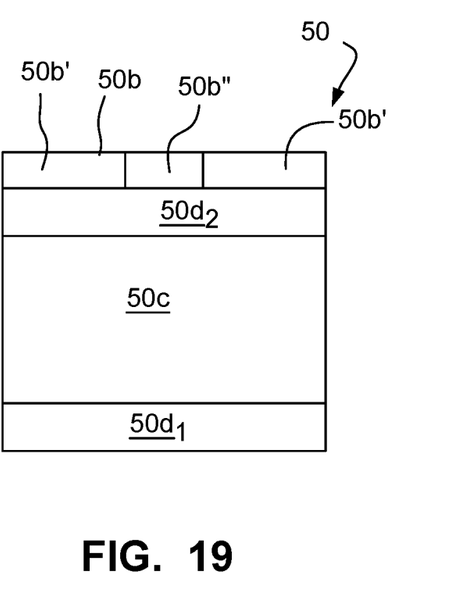
Figure 20:
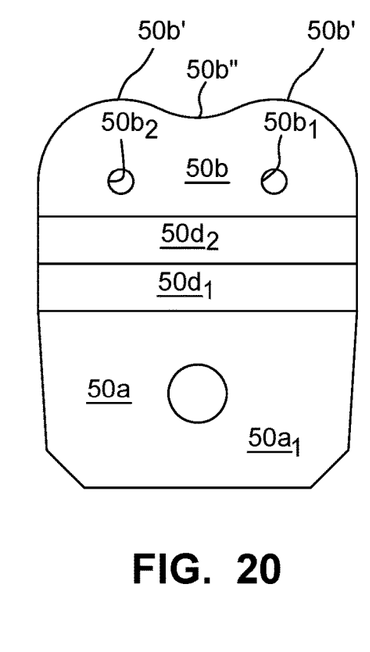
FIGS. 20 and 21 are bottom and top plan views, respectively, of the Z-shaped molded support bracket shown in FIG. 17.
Figure 21:
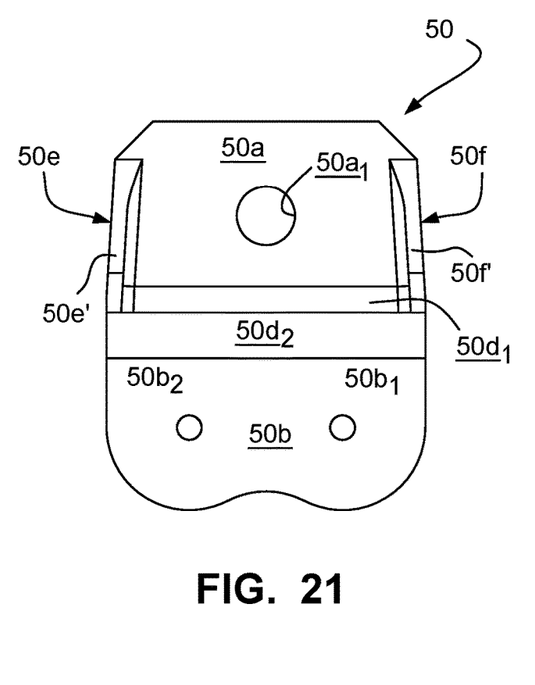
Figure 22:
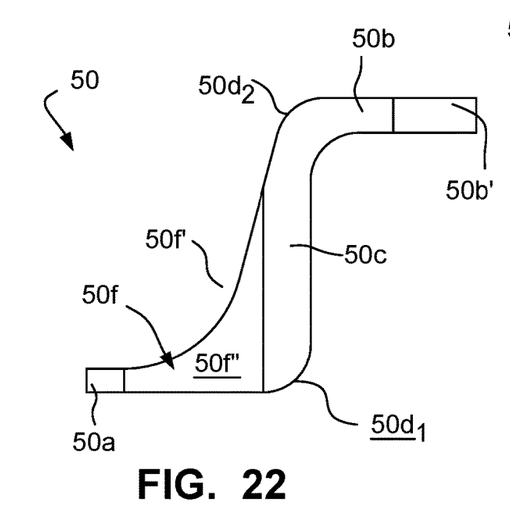
FIGS. 22 and 23 are right and left elevational views, respectively, of the Z-shaped molded support bracket shown in FIG. 17.
Figure 23:
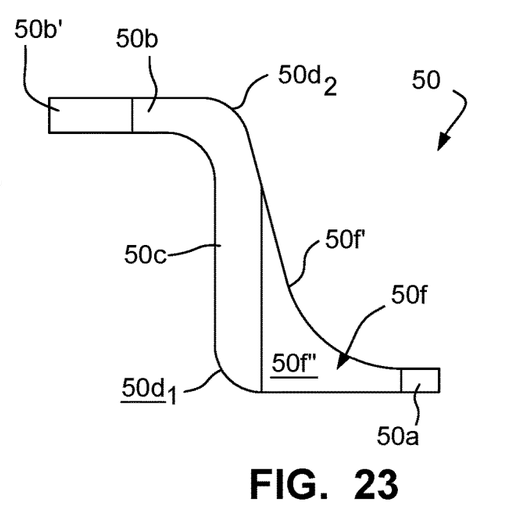
Figure 24:
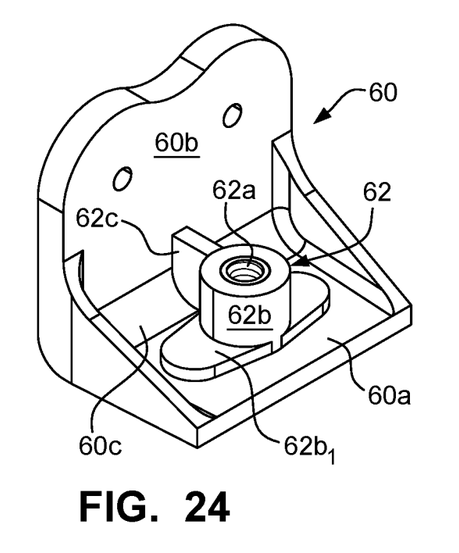
FIG. 24 is a left front perspective view of another embodiment of an L-shaped molded support bracket.
Figure 25:
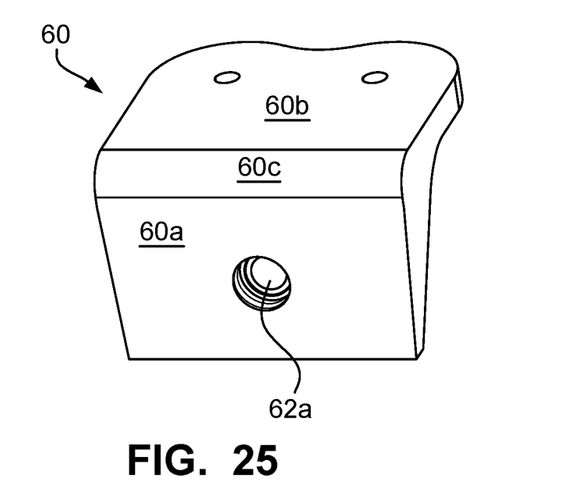
FIG. 25 is bottom perspective view of the L-shaped molded support bracket shown in FIG. 24.
Figure 26:
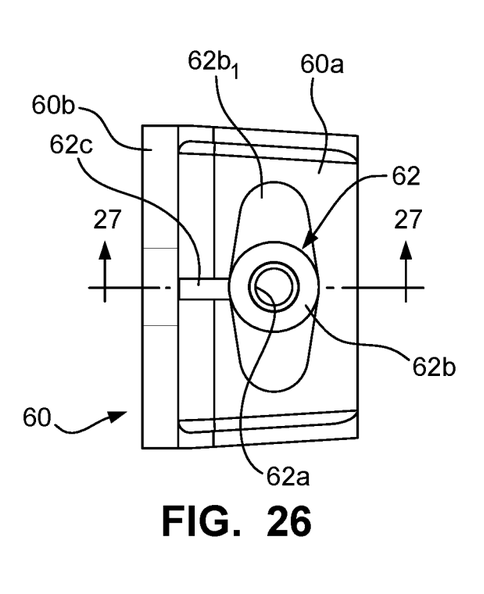
FIG. 26 is a top plan view of the L-shaped molded support bracket shown in FIG. 24.
Figure 28:
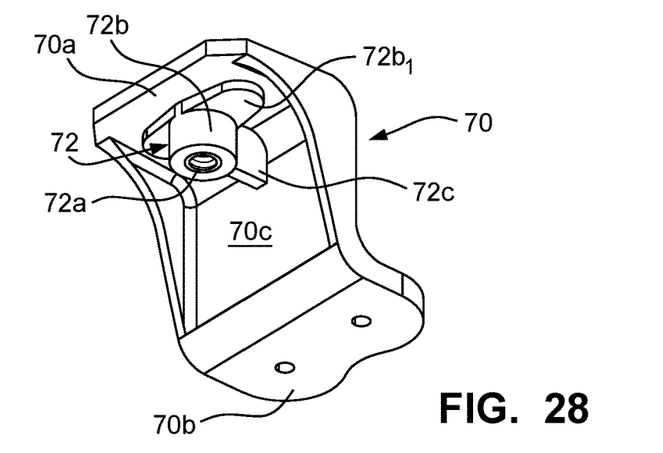
FIG. 28 is a bottom perspective view of another embodiment of a Z-shaped molded support bracket.
Figure 29:
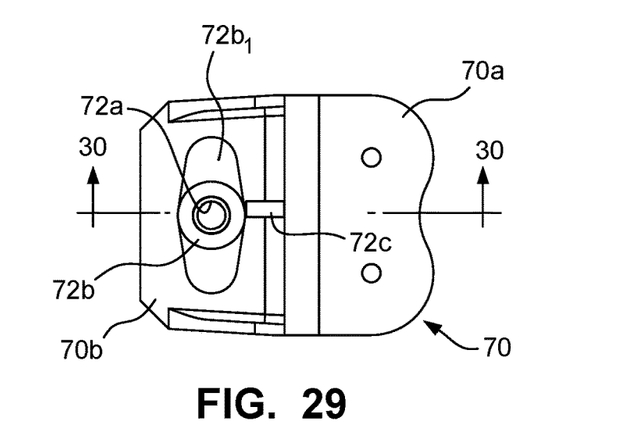
FIG. 29 is a top plan view of the Z-shaped molded support bracket shown in FIG. 28.
Figure 30:
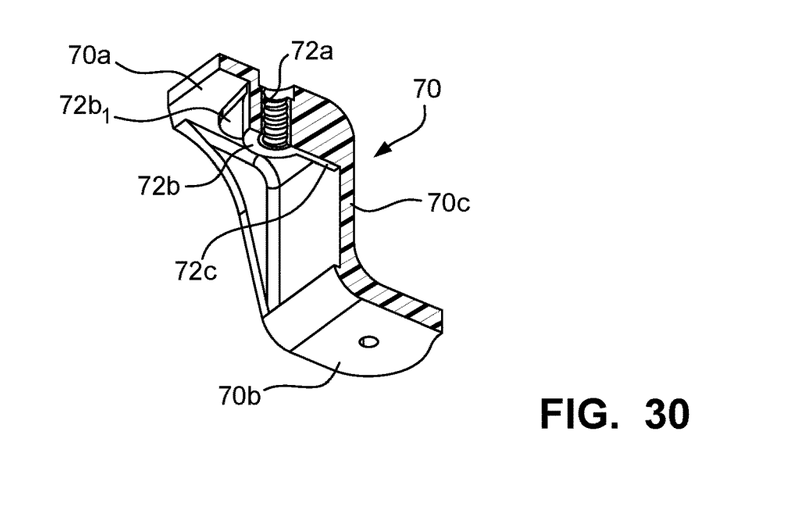
FIG. 30 is a cross-sectional perspective view of the Z-shaped molded support bracket taken along line 30-30 in FIG. 29.
Figure 31:
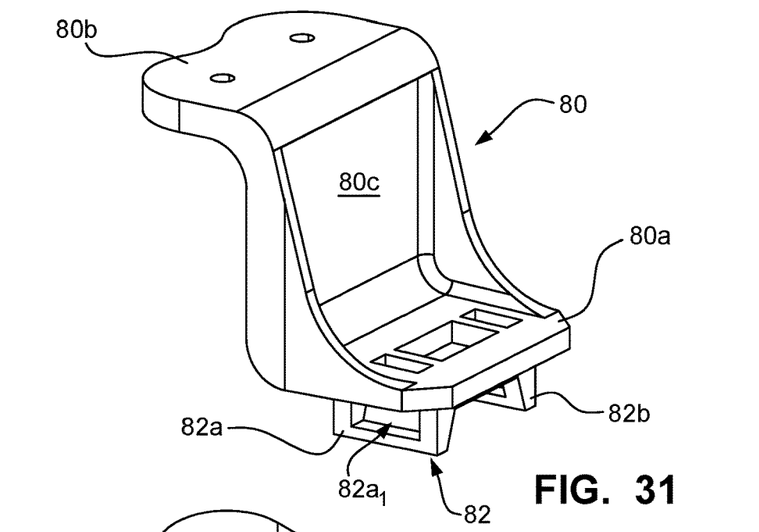
FIG. 31 is a right front perspective view of yet another embodiment of a Z-shaped molded support bracket.
Figure 32:
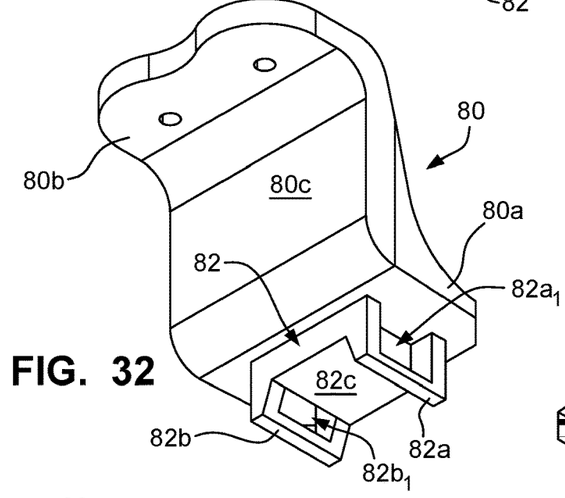
FIG. 32 is a bottom right perspective view of the Z-shaped molded support bracket shown in FIG. 31.
Figure 33:
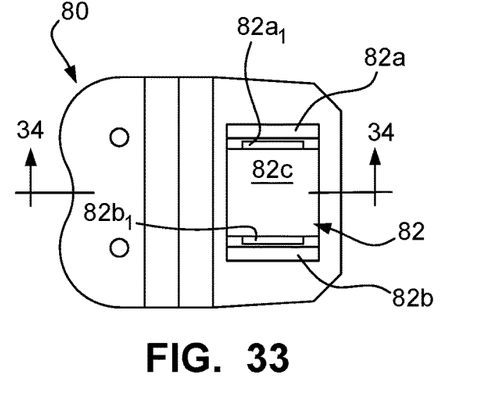
FIG. 33 is a bottom plan view of the Z-shaped molded support bracket shown in FIG. 31.
Figure 34:
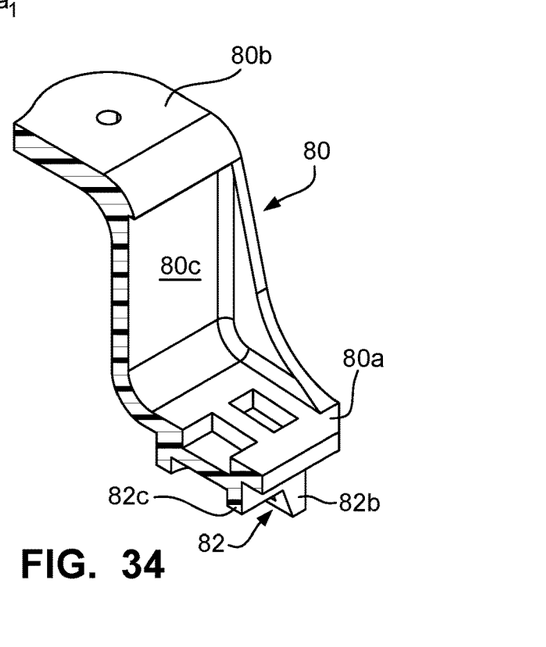
FIG. 34 is a cross-sectional perspective view of the Z-shaped molded support bracket taken along line 34-34 in FIG. 33.

A further embodiment of a one-piece (unitary) Z-shaped molded support bracket 70 is shown in FIGS. 28-30. As shown therein, the bracket 70 is essentially a one-piece component structure molded from a suitable thermoplastics material (e.g., nylon, polyolefin or the like) that is similar to the embodiment of the bracket 50 as shown in FIGS. 15-16. Specifically, the bracket 70 is an injection-molded one-piece component formed of a suitable injection moldable thermoplastic material which includes a first forwardly extending support flange 70a, a second rearwardly extending support flange 70b and a central backing flange 70c having opposed ends respectively joined to the first and second support flanges 70a, 70b. As shown, the first and second support flanges 70a, 70b, respectively, are essentially parallel to one another with the central backing flange 70c being joined to the first and second support flanges 70a, 70b at substantially right angles (90°) relative thereto. The forward edge of the first backing flange 70a may have beveled corners.

Similar to the embodiment of the bracket 60 described above, the nut plate 72 is provided as a one-piece molded unit with the first, second and central flanges 70a, 70b and 70c, respectively, as shown in FIG. 30. In this regard, the nut plate 72 includes a metal threaded nut cylinder 72a which is embedded within and overmolded with the moldable thermoplastic material forming the cylindrical nut plate boss 72b (as well as the remainder of the molded bracket 70) extending from a generally elliptical planar nut plate unitarily molded on the first flange 70a. A planar supporting web 72c is also unitarily molded with the cylindrical nut plate boss 72b and extends radially from the nut plate boss 72b toward the central flange 70c. The supporting web 72c is thus unitarily joined to both the first and the central flanges 70a, 70c as well as being unitarily joined to the cylindrical nut plate boss 72b.

A further embodiment of a one-piece (unitary) Z-shaped molded support bracket 80 is shown in FIGS. 31-34. As shown therein, the bracket 80 is essentially a one-piece component structure molded from a suitable thermoplastics material (e.g., nylon, polyolefin or the like) that is similar to the embodiment of the bracket 70 as shown in FIGS. 28-30. Specifically, the bracket 80 is an injection-molded one-piece component formed of a suitable injection moldable thermoplastic material which includes a first forwardly extending support flange 80a, a second rearwardly extending support flange 80b and a central backing flange 80c having opposed ends respectively joined to the first and second support flanges 80a, 80b. As shown, the first and second support flanges 80a, 80b, respectively, are essentially parallel to one another with the central backing flange 80c being joined to the first and second support flanges 80a, 80b at substantially right angles (90°) relative thereto. The forward edge of the first backing flange 70a may have beveled corners.

A wire, tubing or cable mount 82 is unitarily molded with the second support flange 80b so as to dependently extend therefrom. As shown, the one-piece wire mount 82 is a one-piece U-shaped structure which is provided with a planar rectangular base member 82c and laterally spaced-apart opposed mounting fingers 82a, 82b provided at each end of the based member 82c so as to define a space therebetween. Each of the mounting fingers 82a, 82b defines a generally rectangular aperture 82a1, 82b1, respectively. Wiring, tubing or cabling (not shown) may therefore be placed in the defined space between the mounting fingers 82a, 82b and connected to the mount 82 (and hence the support bracket 80) by conventional cable ties (not shown) or like attachment means extending through the apertures 82a1, 82b1 of the wire mount fingers 82a, 82b, respectively, and around the wiring, tubing or cabling.

While reference is made to particular embodiments of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A one-piece molded thermoplastic support bracket for supporting wiring and/or tubing, the support bracket comprising:
    a bracket member comprising a first support flange, and a second flange, and a junction region having a concave inner surface and a convex outer surface which unitarily joins the first support flange and the second support flange to one another at a substantially right angle; and
    a nut plate formed with the first support flange, wherein the nut plate comprises:
    (i) a planar nut plate base unitarily molded with the first support flange;
    (ii) a cylindrical nut plate boss which extends from and is unitarily formed as a one-piece molded unit with the planar nut plate base;
    (iii) a planar supporting web extending radially from the cylindrical nut plate boss and unitarily joining the cylindrical nut plate boss and the first support flange; and
    (iv) a metal threaded nut cylinder which is embedded within and overmolded with the cylindrical nut plate boss.

2. The support bracket according to claim 1, further comprising a third support flange unitarily molded with the second support flange and extends in an opposite direction of the first support flange.

3. The support bracket according to claim 2, which further comprises a second junction region having a concave inner surface and a convex outer surface which unitarily joins the second support flange and the third support flange to one another at a substantially right angle.

4. The support bracket according to claim 1, wherein the planar nut base is generally elliptical.

5. The support bracket according to claim 1, which further comprises right and left side walls integrally joining the first and second support flanges.

6. The support bracket according to claim 5, wherein the right and left side walls are generally triangularly shaped.

7. The support bracket according to claim 6, wherein each of the right and left side walls includes a perimeter flange having a generally triangularly shaped lateral edge, and a side wall plate joined to the lateral edge of the perimeter flange.

8. The support bracket according to claim 7, wherein the side walls generally define a right triangle with respective adjoining right angle legs being integral with the first and second support flanges and a concavely curved hypotenuse leg extending downwardly from the second support flange to a terminal end of the first support flange.

9. The support bracket according to claim 2, wherein the third support flange includes a pair of lateral convex lobes and a central concave recess between the convex lobes.

10. An aircraft which comprises the support bracket according to claim 1.

11. A one-piece molded thermoplastic support bracket for supporting wiring, cabling and/or tubing, the support bracket comprising:
    a bracket member comprising a first support flange, and a second flange, and a junction region having a concave inner surface and a convex outer surface which unitarily joins the first support flange and the second support flange to one another at a substantially right angle; and
    a generally U-shaped wire, cable or tubing mount unitarily formed as a one-piece molded unit with the first support flange so as to dependently extend therefrom, wherein the wire, cable or tubing mount includes:
    (i) a generally rectangular base member unitarily formed with the first support flange;
    (ii) a pair of laterally spaced apart opposed mounting fingers unitarily formed at each end of the base member so as to define a space therebetween which is adapted to receive wiring, tubing or cabling, and
    (iii) generally rectangular apertures formed in each of the mounting fingers and adapted to receive therein a cable tie to thereby connect the wiring, tubing or cabling in the defined space between the mounting fingers to the wire, cable or tubing mount.

12. The support bracket according to claim 11, further comprising a third support flange unitarily molded with the second support flange and extends in an opposite direction of the first support flange.

13. The support bracket according to claim 12, which further comprises a second junction region having a concave inner surface and a convex outer surface which unitarily joins the second support flange and the third support flange to one another at a substantially right angle.

14. The support bracket according to claim 11, which further comprises right and left side walls integrally joining the first and second support flanges.

15. The support bracket according to claim 14, wherein the right and left side walls are generally triangularly shaped.

16. The support bracket according to claim 15, wherein each of the right and left side walls includes a perimeter flange having a generally triangularly shaped lateral edge, and a side wall plate joined to the lateral edge of the perimeter flange.

17. The support bracket according to claim 16, wherein the side walls generally define a right triangle with respective adjoining right angle legs being integral with the first and second support flanges and a concavely curved hypotenuse leg extending downwardly from the second support flange to a terminal end of the first support flange.

18. The support bracket according to claim 11, wherein the third support flange includes a pair of lateral convex lobes and a central concave recess between the convex lobes.

19. An aircraft which comprises the support bracket according to claim 11.

* * * * *